US009665509B2

(12) United States Patent
Ansari et al.

(10) Patent No.: US 9,665,509 B2
(45) Date of Patent: May 30, 2017

(54) MECHANISM FOR INTER-PROCESSOR INTERRUPTS IN A HETEROGENEOUS MULTIPROCESSOR SYSTEM

(71) Applicant: Xilinx, Inc., San Jose, CA (US)

(72) Inventors: Ahmad R. Ansari, San Jose, CA (US); Felix Burton, Foster City, CA (US)

(73) Assignee: XILINX, INC., San Jose, CA (US)

( * ) Notice: Subject to any disclaimer, the term of this patent is extended or adjusted under 35 U.S.C. 154(b) by 329 days.

(21) Appl. No.: 14/464,654

(22) Filed: Aug. 20, 2014

(65) Prior Publication Data

US 2016/0055106 A1    Feb. 25, 2016

(51) Int. Cl.
*G06F 13/24*    (2006.01)
*G06F 9/48*    (2006.01)

(52) U.S. Cl.
CPC ............ *G06F 13/24* (2013.01); *G06F 9/4812* (2013.01)

(58) Field of Classification Search
CPC .............................. G06F 13/24; G06F 9/4812
USPC .................................................. 710/260–269
See application file for complete search history.

(56) References Cited

U.S. PATENT DOCUMENTS

| 4,215,399 | A | * | 7/1980 | Pavicic | G05B 19/052 700/7 |
| 5,136,714 | A | * | 8/1992 | Braudaway | G06F 15/167 710/260 |
| 5,202,998 | A | * | 4/1993 | Yanes | G06F 15/17 710/267 |
| 5,210,828 | A | * | 5/1993 | Bolan | G06F 15/167 709/214 |
| 5,319,753 | A | * | 6/1994 | MacKenna | G06F 13/24 710/48 |
| 5,446,910 | A | * | 8/1995 | Kennedy | G06F 15/17 710/1 |
| 5,513,346 | A | | 4/1996 | Satagopan et al. | |
| 5,560,019 | A | * | 9/1996 | Narad | G06F 15/17 710/260 |
| 5,761,516 | A | * | 6/1998 | Rostoker | G06F 9/4812 709/201 |

(Continued)

FOREIGN PATENT DOCUMENTS

WO    2013100948    7/2013

*Primary Examiner* — Paul R Myers
(74) *Attorney, Agent, or Firm* — Keith Taboada; Steven Roberts; Robert M. Brush (57) ABSTRACT

Apparatus and methods for handling inter-processor interrupts (IPIs) in a heterogeneous multiprocessor system are provided. The scalable IPI mechanism provided herein entails minimal logic and can be used for heterogeneous inter-processor communication, such as between application processors, real-time processors, and FPGA accelerators. This mechanism is also low cost, in terms of both logic area and programmable complexity. One example system generally includes a first processor, a second processor being of a different processor type than the first processor, and an IPI circuit. The IPI circuit typically includes a first register associated with the first processor, wherein a first bit in the first register indicates whether the first processor has requested to interrupt the second processor; and a second register associated with the second processor, wherein a second bit in the second register indicates whether the second processor has requested to interrupt the first processor.

22 Claims, 8 Drawing Sheets

(56) References Cited

U.S. PATENT DOCUMENTS

| | | | | |
|---|---|---|---|---|
| 5,790,850 A * | 8/1998 | Natu | ................... | G06F 9/4405 |
| | | | | 709/222 |
| 5,987,538 A | 11/1999 | Tavallaei et al. | | |
| 6,219,743 B1 | 4/2001 | Kennel et al. | | |
| 6,725,309 B1 * | 4/2004 | Kim | ................... | G06F 13/26 |
| | | | | 710/260 |
| 7,096,296 B2 * | 8/2006 | Liu | ................... | G06F 13/387 |
| | | | | 710/15 |
| 7,484,024 B2 * | 1/2009 | Kwon | ................... | G06F 13/24 |
| | | | | 710/264 |
| 7,617,346 B2 * | 11/2009 | Wang | ................... | G06F 9/30094 |
| | | | | 710/264 |
| 8,667,192 B2 | 3/2014 | Allaire et al. | | |
| 8,984,199 B2 * | 3/2015 | Hammarlund | ........ | G06F 9/4812 |
| | | | | 710/260 |
| 2001/0037426 A1 * | 11/2001 | Pawlowski | ............ | G06F 13/24 |
| | | | | 710/260 |
| 2002/0091826 A1 * | 7/2002 | Comeau | ................... | G06F 9/546 |
| | | | | 709/226 |
| 2005/0193157 A1 * | 9/2005 | Kwon | ................... | G06F 13/24 |
| | | | | 710/260 |
| 2006/0020852 A1 * | 1/2006 | Bernick | ................... | G06F 13/26 |
| | | | | 714/11 |
| 2008/0141277 A1 * | 6/2008 | Traut | ................... | G06F 9/45533 |
| | | | | 719/313 |
| 2009/0157936 A1 * | 6/2009 | Goss | ................... | G06F 1/3203 |
| | | | | 710/264 |
| 2010/0191887 A1 | 7/2010 | Serebrin | | |
| 2011/0040915 A1 * | 2/2011 | Strauss | ................... | G06F 9/4818 |
| | | | | 710/267 |
| 2011/0087815 A1 * | 4/2011 | Kruglick | ................... | G06F 13/24 |
| | | | | 710/260 |
| 2012/0089984 A1 * | 4/2012 | Adar | ................... | G06F 9/4812 |
| | | | | 718/103 |
| 2014/0068289 A1 * | 3/2014 | Beck | ................... | G06F 1/3203 |
| | | | | 713/320 |
| 2014/0136746 A1 | 5/2014 | Tiruvallur et al. | | |
| 2015/0067217 A1 * | 3/2015 | Feehrer | ................... | G06F 11/0793 |
| | | | | 710/263 |

* cited by examiner

Trigger Registers

| | | | | | |
|---|---|---|---|---|---|
| Processing Unit 0 | ••• | 2 | 1 | 0 | 202₀ |
| | Reserved | PU_2 | PU_1 | PU_0 | |
| Processing Unit 1 | ••• | 2 | 1 | 0 | 202₁ |
| | Reserved | PU_2 | PU_1 | PU_0 | |
| Processing Unit 2 | ••• | 2 | 1 | 0 | 202₂ |
| | Reserved | PU_2 | PU_1 | PU_0 | |

IPI Destinations (columns 2, 1, 0)

Status Registers

| | | | | | |
|---|---|---|---|---|---|
| Processing Unit 0 | ••• | 2 | 1 | 0 | 204₀ |
| | Reserved | PU_2 | PU_1 | PU_0 | |
| Processing Unit 1 | ••• | 2 | 1 | 0 | 204₁ |
| | Reserved | PU_2 | PU_1 | PU_0 | |
| Processing Unit 2 | ••• | 2 | 1 | 0 | 204₂ |
| | Reserved | PU_2 | PU_1 | PU_0 | |

IPI Sources (columns 2, 1, 0)

Clear Registers

| | | | | | |
|---|---|---|---|---|---|
| Processing Unit 0 | ••• | 2 | 1 | 0 | 206₀ |
| | Reserved | PU_2 | PU_1 | PU_0 | |
| Processing Unit 1 | ••• | 2 | 1 | 0 | 206₁ |
| | Reserved | PU_2 | PU_1 | PU_0 | |
| Processing Unit 2 | ••• | 2 | 1 | 0 | 206₂ |
| | Reserved | PU_2 | PU_1 | PU_0 | |

IPI Sources (columns 2, 1, 0)

Reference: 108

MECHANISM FOR INTER-PROCESSOR INTERRUPTS IN A HETEROGENEOUS MULTIPROCESSOR SYSTEM

TECHNICAL FIELD

Examples of the present disclosure generally relate to processor interrupts and, more particularly, to inter-processor interrupts in a heterogeneous multiprocessor system.

BACKGROUND

Integrated circuits (Cs) may be implemented to perform specified functions. One type of IC is a programmable IC, such as a field programmable gate array (FPGA). An FPGA typically includes an array of programmable tiles. These programmable tiles may include, for example, input/output blocks (IOBs), configurable logic blocks (CLBs), dedicated random access memory blocks (BRAM), multipliers, digital signal processing blocks (DSPs), processors, dock managers, delay lock loops (DLLs), and so forth.

Each programmable the typically includes both programmable interconnect circuitry and programmable logic circuitry. The programmable interconnect circuitry typically includes a large number of interconnect lines of varying lengths interconnected by programmable interconnect points (PIPs). The programmable logic circuitry implements the logic of a user design using programmable elements that may include, for example, function generators, registers, arithmetic logic, and so forth.

The programmable interconnect circuitry and programmable logic circuitry are typically programmed by loading a stream of configuration data into internal configuration memory cells that define how the programmable elements are configured. The configuration data may be read from memory (e.g., from an external PROM) or written into the FPGA by an external device. The collective states of the individual memory cells then determine the function of the FPGA.

Another type of programmable IC is the complex programmable logic device, or CPLD. A CPLD includes two or more "function blocks" connected together and to input/output (I/O) resources by an interconnect switch matrix. Each function block of the CPLD includes a two-level AND/OR structure similar to those used in programmable logic arrays (PLAs) and programmable array logic (PAL) devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable ICs, the functionality of the device is controlled by data bits provided to the device for that purpose. The data bits may be stored in volatile memory (e.g., static memory cells; as in FPGAs and some CPLDs), in non-volatile memory (e.g., FLASH memory, as in some CPLDs), or in any other type of memory cell.

Other programmable ICs are programmed by applying a processing layer, such as a metal layer, that programmably interconnects the various elements on the device. These programmable ICs are known as mask programmable devices. Programmable ICs may also be implemented in other ways (e.g., using fuse or antifuse technology). The phrase "programmable IC" can include, but is not limited to these devices and further can encompass devices that are only partially programmable including, for example, application specific integrated circuits (ASICs). For instance, another type of programmable IC includes a combination of hard-coded transistor logic and a programmable switch fabric that programmably interconnects the hard-coded transistor logic.

Some modern ICs, including some of the varieties of ICs discussed above, include an embedded processor that is capable of executing program code. The processor can be fabricated as part of the same die that includes the programmable logic circuitry and the programmable interconnect circuitry, also referred to collectively as the "programmable circuitry" of the IC. It should be appreciated that execution of program code within a processor is distinguishable from "programming" or "configuring" the programmable circuitry that may be available on an IC. The act of programming or configuring programmable circuitry of an IC results in the implementation of different physical circuitry as specified by the configuration data within the programmable circuitry.

SUMMARY

Examples of the present disclosure generally relate to managing inter-processor interrupts in a heterogeneous multiprocessor system.

One example of the present disclosure is a system. The system generally includes a first processor, a second processor being of a different processor type than the first processor, and an inter-processor interrupt (IPI) circuit coupled to the first and second processors. The IPI circuit typically includes a first register associated with the first processor, wherein a first bit in the first register indicates whether the first processor is requesting to interrupt the second processor; and a second register associated with the second processor, wherein a second bit in the second register indicates whether the second processor is requesting to interrupt the first processor.

Another example of the present disclosure is an integrated circuit (IC). The IC generally includes a processing system (PS) portion having one or more hard-wired processors, a programmable logic (PL) portion having one or more soft processors with physically configurable circuitry, and one or more inter-processor interrupt (IPI) circuits. Each IPI circuit is typically configured to generate one or more interrupt signals between different processors, wherein at least one of the interrupt signals is between one of the hard-wired processors in the PS portion and one of the soft processors in the PL portion.

Yet another example of the disclosure is a method for handling IPIs. The method generally includes receiving, at an IPI circuit, a request from a first processor to interrupt a second processor, wherein the second processor is of a different processor type than the first processor; based on the received request, updating a first bit in a first register associated with the first processor, wherein the first bit indicates that the first processor is requesting to interrupt the second processor; and sending an interrupt signal from the IPI circuit to the second processor based on the updating.

BRIEF DESCRIPTION OF THE DRAWINGS

So that the manner in which the above-recited features of the present disclosure can be understood in detail, a more particular description of the implementation, briefly summarized above, may be had by reference to examples, some of which are illustrated in the appended drawings. It is to be noted, however, that the appended drawings illustrate only typical examples of this disclosure and are therefore not to be considered limiting of its scope, for the disclosure may admit to other equally effective examples.

DETAILED DESCRIPTION

Examples of the present disclosure provide techniques and apparatus for handling inter-processor interrupts in a heterogeneous multiprocessor system, where at least some of the processors are of a different nature and may not be able to directly interrupt one another. The inter-processor interrupt (IPI) mechanism described herein provides an IPI controller as an IPI interface between the various processors. The IPI controller includes a trigger register for each IPI source, a status register for each IPI destination, and a clear register for each IPI destination, where the registers scale with the number of processors in the system. This scalable IPI mechanism enables such diverse processors as application processors, real-time processors, and field programmable gate array (FPGA) accelerators to communicate with each other via interrupts. The IPI mechanism is also low-cost in terms of both logic area and programmable complexity.

Example IPI Mechanism in a Generic Heterogeneous Multiprocessor System

In a system with multiple processors, it may be desirable for the various processors to interrupt one another. An IPI mechanism is typically used to implement a cache coherency synchronization point, communication channels, or mail-boxes, for example. However, a multiprocessor system may include various processors of different natures that do not have built-in features for synchronization and cannot directly interrupt one another. As used herein, the phrase "directly interrupt" generally refers to one processor being able to interrupt another processor without an intermediary (e.g., by sending an interrupt signal from the one processor to the other).

Figure 1A:
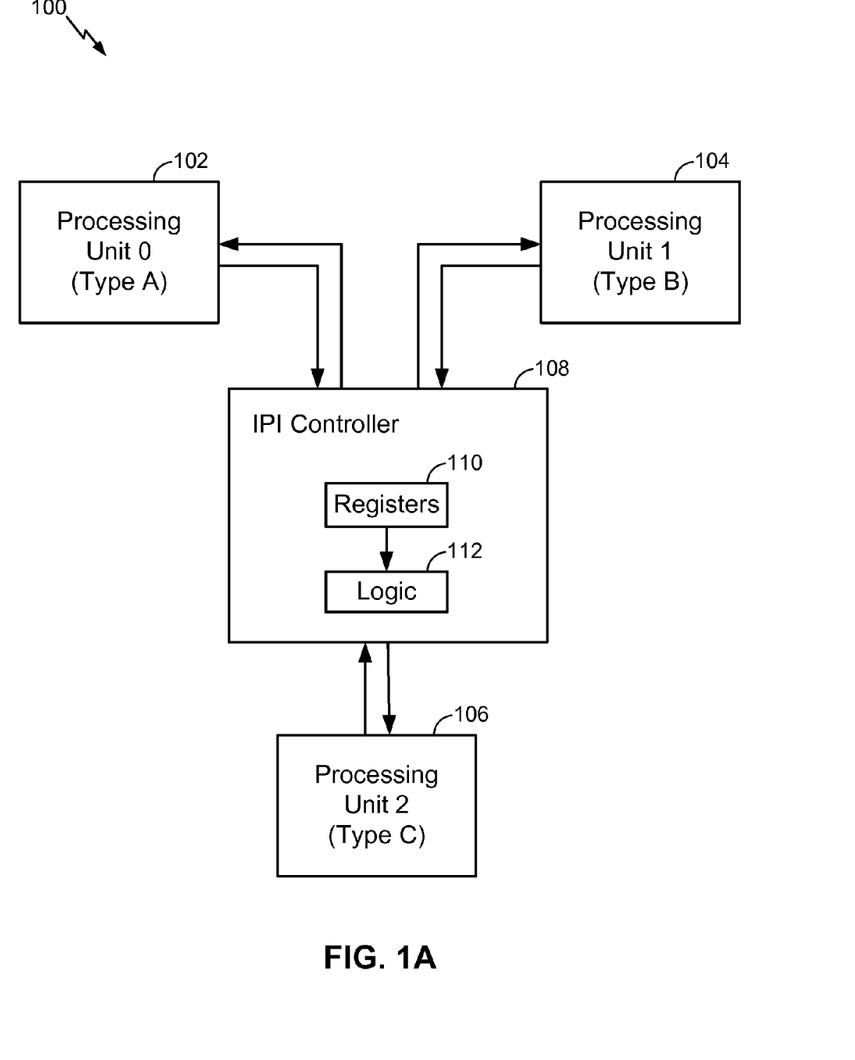
FIG. 1A illustrates an example heterogeneous multiprocessor system, in accordance with an example of the present disclosure.

FIG. 1A illustrates an example heterogeneous multiprocessor system 100, in accordance with an example of the present disclosure. As used herein, a heterogeneous multiprocessor system generally refers to a processing system with multiple processors, where at least two of the processors are different processor types (i.e., are of a different kind or nature). In certain cases, a heterogeneous multiprocessor system may also refer to a processing system with multiple processors, where at least two of the processors are in different processor clusters (whether the same or different processor types). As an example, the system 100 includes three diverse processing units 102, 104, 106: processing unit 0 which is processor type A, processing unit 1 which is processor type B, and processing unit 2 which is processor type C. In order for these heterogeneous processing units to interrupt one another, an IPI controller 108 is connected with each of the processing units 102, 104, 106, such that processing unit 0 can interrupt processing unit 1 or processing unit 2, for example. The IPI controller 108 may include registers 110 and logic 112 for processing register contents, as described below.

Figure 2:
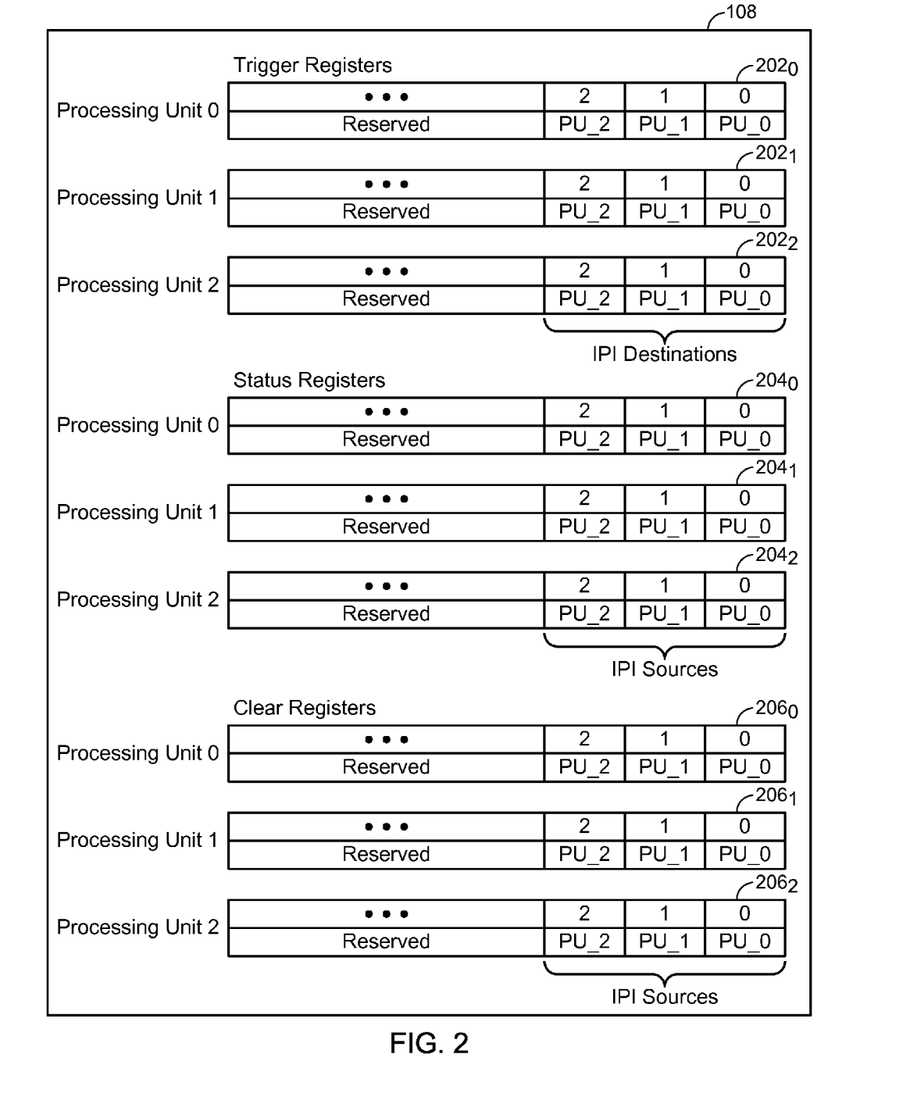
FIG. 2 illustrates example registers in an inter-processor interrupt (IPI) controller in the systems of FIGS. 1A and 1B, in accordance with an example of the present disclosure.
Figure 3:
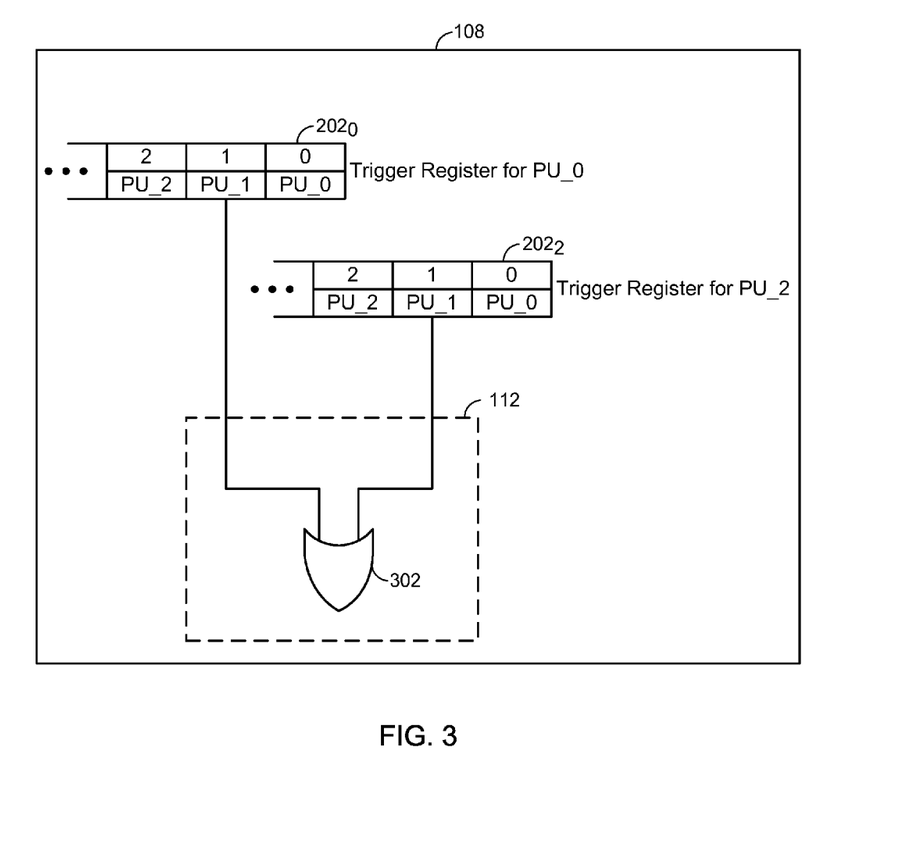
FIG. 3 illustrates example logic in the IPI controller for generating an interrupt based on contents of the registers in FIG. 2, in accordance with an example of the present disclosure.

FIGS. 2 and 3 illustrate an example implementation of the IPI controller 108. In the IPI terminology used herein, an interrupting processor is referred to as the source, source processor, or IPI source, and the processor that gets interrupted is referred to as the destination, destination processor, or IPI destination. Any of the processing units 102, 104, 106 may act as a source or a destination. The IPI mechanism described herein is designed in a modular manner, which allows the mechanism to be easily expanded in the future. The smallest modular unit is called a "set," which includes one register per IPI source (or per IPI destination, depending on the type of register). For the example system 100 of FIG. 1A, a set includes three registers.

FIG. 2 illustrates example registers in the IPI controller 108, in accordance with an example of the present disclosure. The IPI controller 108 includes one set of three trigger registers $202_0$ through $202_2$ (collectively "registers 202" or "trigger registers 202"), one set of three status registers $204_0$ through $204_2$ (collectively "registers 204" or "status registers 204"), and one set of three clear registers $206_0$ through $206_2$ (collectively "registers 206" or "clear registers 206"). The registers 202, 204, and 206 have at least enough bits to cover the number of potential destinations (or sources) in the multiprocessor system 100, and the remaining bits (if any) may be reserved for future expansion. For example, the trigger registers 202, the status registers 204, and the clear registers 206 may be 8-bit registers, where the five most significant bits (MSBs) are reserved and the three least significant bits (LSBs) are associated with processing units in the multiprocessor system 100.

The IPI controller 108 may allow only the source that is associated with a particular one of the trigger registers 202 to access that register. For example, the IPI controller 108 may only permit processing unit 1 to access trigger register $202_1$. Access by any other source may generate an address decode error. In this manner, the IPI controller 108 controls access to the various registers, providing a protection mechanism. All three trigger registers 202 in the set have an identical format that allocates one bit for each IPI destination for a total of three bits (e.g., the three LSBs). By writing a logic '1' to any of these bits, the source that is associated with a particular one of the trigger registers 202 may generate an interrupt at the destination represented by that bit. For example, to indicate that processing unit 1 is requesting to interrupt processing unit 2, the IPI controller 108 allows processing unit 1 to write a logic '1' to IPI destination bit 2 of the trigger resister $202_1$. An IPI source may read from its associated trigger register to obtain status of its triggers (e.g., processing unit 1 can read from the trigger register $202_1$ to obtain status of its triggers).

In order to generate an interrupt for a particular IPI destination, the specific IPI destination bit in every trigger register 202 of the set may be logically combined (e.g., ORed by an OR gate 302 of the logic 112 or exclusively ORed) in the IPI controller 108. For other examples as illustrated in FIG. 3, the OR gate 302 (or other logic gate) may logically OR (or otherwise combine) the specific IPI destination bit in every trigger register 202 of the set, except for the particular trigger register associated with the IPI source that is the same processing unit as this particular IPI destination to be interrupted (e.g., in cases where the given processing unit does not interrupt itself via the IPI controller 108). For example, the IPI controller 108 may generate an interrupt for processing unit 1 if bit 1 of the trigger register $202_0$ associated with processing unit 0 is a logic '1' or if bit 1 of the trigger register $202_2$ associated with processing unit 2 is a logic '1'. The logic 112 in the IPI controller 108 may include a similarly configured OR (or other logic) gate for each potential IPI destination, for a total of three separate interrupt-generating OR gates in the example IPI controller 108. The logic 112 in the IPI controller 108 may include similar logic configurations for other processing units (e.g., processing unit 0 and processing unit 2).

Returning to FIG. 2, when a destination processor is interrupted, the destination processor may read from an associated one of the read-only status registers 204 that is allocated to that destination to determine which IPI source contributed to that interrupt. For example, after being interrupted, processing unit 2 may read bit 1 of status register $204_2$ to determine that processing unit 1 was responsible for this interrupt. All three status registers 204 in the set have an identical format that allocates one bit for each IPI source for a total of three bits (e.g., the three LSBs). A similar one of the write-only clear registers 206 is used to clear the request from the IPI source in the corresponding one of the status registers 204. If a logic '1' is written to any bit in a given clear register 206, the request for the interrupt that is associated with that source is cleared. Writing a logic '0' has no impact in this case. There is a separate status register 204 and a separate clear register 206 associated with each IPI destination in a set. The status and clear registers associated with the same destination are mapped to the same address. Accesses by any IPI destination that is not associated with a status or clear register may result in an address decode error.

For some examples, the trigger registers 202 may write directly to the status registers 204. In this case, the actual storage may occur in the status registers 204, rather than in the trigger registers 202 as shown in FIG. 2. In this case, corresponding bits of the status registers 204 may be logically combined (e.g., ORed) in the IPI controller 108 to generate an interrupt, instead of bits from the trigger registers 202.

Figure 1B:
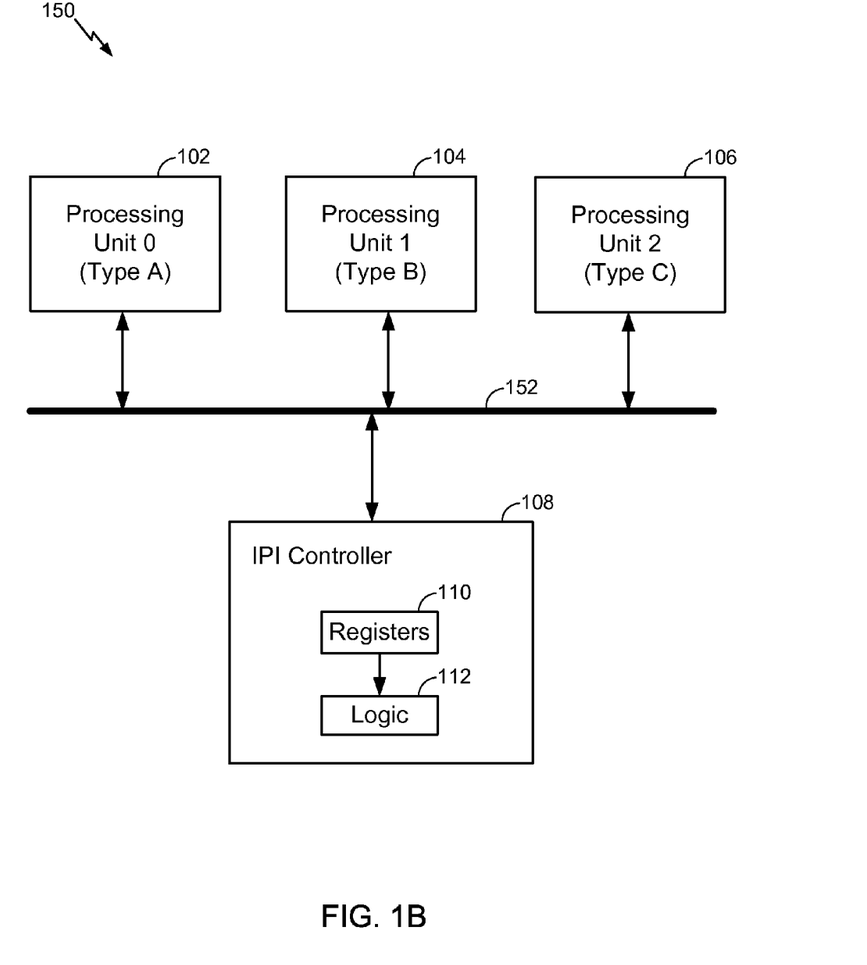
FIG. 1B illustrates the example heterogeneous multiprocessor system of FIG. 1A utilizing an interconnect, in accordance with an example of the present disclosure.

While FIG. 1A is intended to show a logical implementation of a heterogeneous multiprocessor system, the various processing units 102, 104, 106 may be connected with the IPI controller 108 via separate dedicated ports for some examples. For other examples as depicted in the example heterogeneous multiprocessor system 150 of FIG. 1B, access between the various processing units 102, 104, 106 and the IPI controller 108 may be through an interconnect 152 (e.g., a bus), rather than through separate ports. To use shared ports coming from the interconnect 152, the IPI controller 108 may check source identifiers (IDs) or destination IDs and determine which IPI source or destination is attempting to access the various registers 202, 204, 206. By checking IPI source or destination IDs, the IPI controller 108 may restrict a particular IPI source to accessing only registers associated with this IPI source and prevent the IPI source from accessing other registers. This restricted access provides the protection mechanism described above.

Example IPI Mechanism in an IC with Hard-Wired and Soft Processors

As described in U.S. Pat. No. 8,667,192 to Allaire et al., filed Feb. 28, 2011 and entitled "Integrated Circuit with Programmable Circuitry and an Embedded Processor System," herein incorporated by reference in its entirety, an integrated circuit (IC) may include an embedded processor system and programmable circuitry. Configured to execute program code, the processor system may be hard-wired and include a processor hardware resource. The programmable circuitry is configurable to implement different physical circuits and may be coupled to the processor system. The programmable circuitry may be configurable to share usage of the processor hardware resource of the processor system. The processor system may control aspects of the programmable circuitry such as power on and/or off, as well as configuration of the programmable circuitry to implement one or more different physical circuits therein. With both hard-wired processors in the embedded processor system and soft processors in the programmable circuitry, such an IC qualifies as a heterogeneous multiprocessor system and may implement the IPI mechanism described herein.

Figure 4:
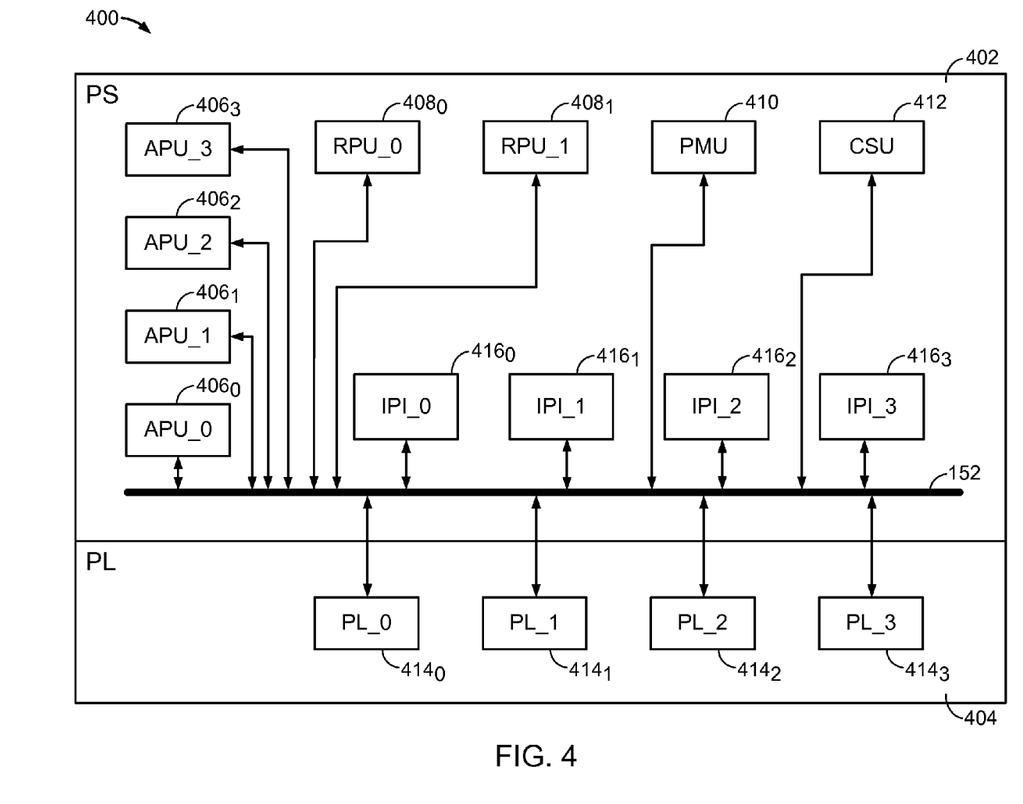
FIG. 4 illustrates an example integrated circuit (IC) having a hard-wired processing system (PS) and programmable logic (PL) configurable to implement different physical circuits, in accordance with an example of the present disclosure.

FIG. 4 illustrates an example IC 400 having a hard-wired processing system (PS) 402 and programmable logic (PL) 404 configurable to implement different physical circuits, in accordance with an example of the present disclosure. Also referred to as an application specific integrated circuit (ASIC) portion, the PS 402 may include four processors $406_0$ through $406_3$ in an Application and Processing Unit (APU) subsystem (labeled APU_0, APU_1, APU_2, and APU_3 and collectively "APU processors 406"), two processors $408_0$ and $408_1$ in a Real-time Processing Unit (RPU) subsystem (labeled RPU_0 and RPU_1 and collectively "RPU processors 408"), one Power Management Unit (PMU) processor 410, and one Configuration and Security Unit (CSU) processor 412. Known also as the FPGA portion, the PL 404 may include four soft processors $414_1$ through $414_3$ (labeled PL_0, PL_1, PL_2, and PL_3 and collectively "soft processors 414"). The APU processors 406 in the APU subsystem, the RPU processors 408 in the RPU subsystem, the PMU processor 410, the CSU processor 412, and the soft processors 414 are categorically of different processor types. Without an intermediary, a processor in a particular subsystem (or of a certain processor type) may not be able to interrupt a processor in a different subsystem (or of a different processor type).

In order for these heterogeneous processors to interrupt one another, an IPI controller $416_0$ is connected with each of the processors 406, 408, 410, 412, 414, such that PL_2 can interrupt APU_3, for example. The IPI controller $416_0$ may be located in the PS 402 as shown. For some examples, access between the various processors 406, 408, 410, 412, 414 and the IPI controller $416_0$ may be through a bus, rather than through separate lines.

For some examples, different interrupt types or "classes" may be created, where the IC includes one IPI controller per interrupt class. Interrupt classes may be differentiated according to priority or exclusivity, for example. Thus, more than one IPI controller may be instantiated for the same group of processors. For example, the classes may include a Linux-based interrupt class or a power-related interrupt class. In the example IC 400 of FIG. 4, there are four different interrupt classes, so the IC includes four different IPI controllers $416_0$ through $416_3$ (labeled IPI_0, IPI_1, IPI_2, and IPI_3 and collectively "IPI controllers 416"). The example implementation of the IPI controller $416_0$ (as depicted in FIGS. 5 and 6) may be replicated in each IPI controller.

Figure 5:
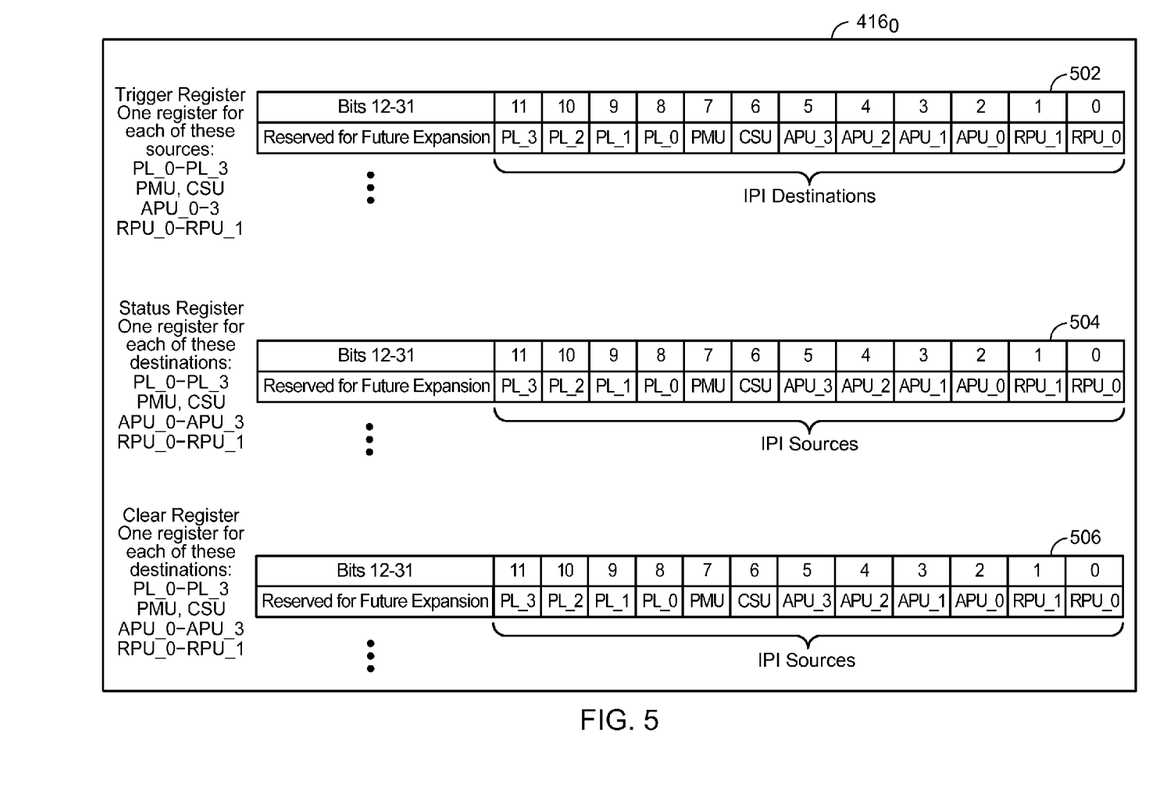
FIG. 5 illustrates example registers in one of the IPI controllers in the system of FIG. 4, in accordance with an example of the present disclosure.
Figure 6:
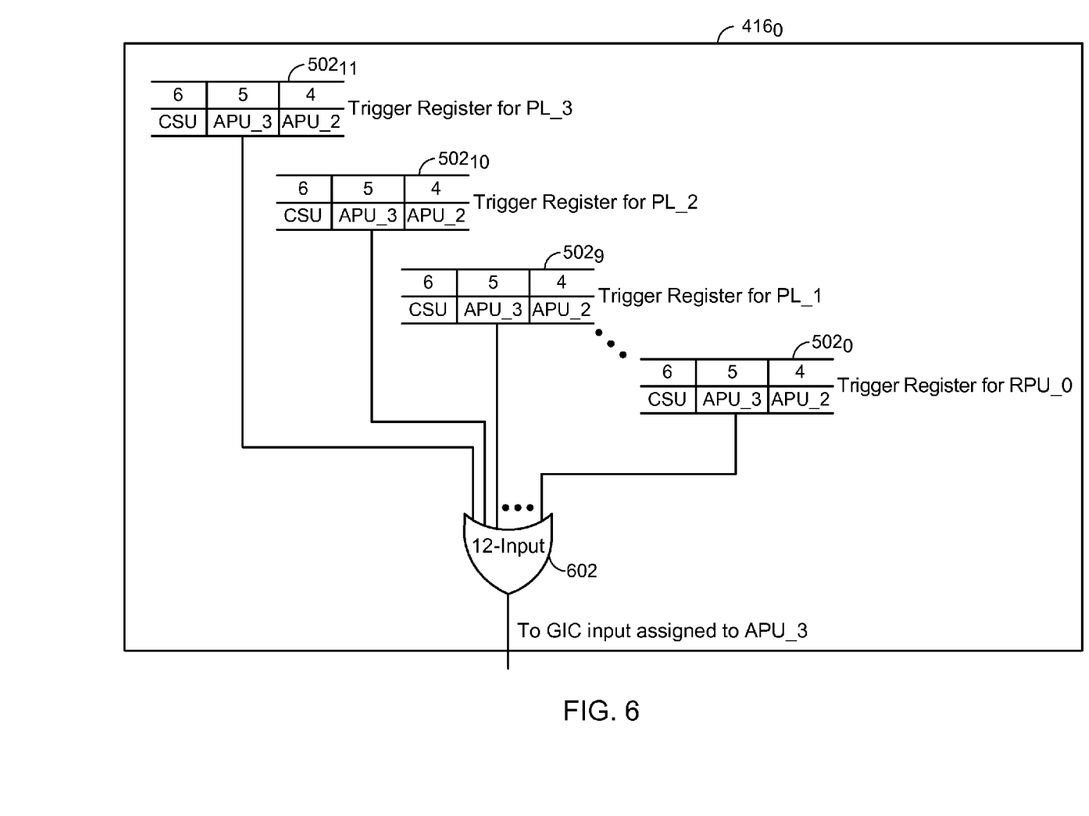
FIG. 6 illustrates example logic in one of the IPI controllers for generating an interrupt based on contents of the registers in FIG. 5, in accordance with an example of the present disclosure.

FIGS. 5 and 6 illustrate an example implementation of the IPI controller $416_0$. As described above, an interrupting processor is referred to as the IPI source, and the processor that gets interrupted is referred to as the IPI destination. Any of the processors 406, 408, 410, 412, 414 may act as a source or a destination. The IPI mechanism described herein is designed in a modular manner, which allows the mechanism to be easily expanded in future generations of the IC 400 and stay code-compatible with the current IC generation. The smallest modular unit is called a "set," which includes one register per IPI source (or per IPI destination). For the example IC 400 of FIG. 4, a set includes 12 registers.

FIG. 5 illustrates example registers in the IPI controller $416_0$, in accordance with an example of the present disclosure. The IPI controller $416_0$ includes one set of 12 trigger registers 502, one set of 12 status registers 504, and one set of 12 clear registers 506. The registers 502, 504, and 506 have at least enough bits to cover the number of potential destinations (or sources) in the IC 400, and the remaining bits (if any) may be reserved for future expansion. For example, the trigger registers 502, the status registers 504, and the clear registers 506 may be 32-bit registers, where the 20 most significant bits (MSBs) 12-31 are reserved.

The IPI controller $416_0$ may allow only the IPI source that is associated with a particular one of the trigger registers 502 to access that register. For example, the IPI controller $416_0$ may permit only PL_3 to access trigger register $502_{11}$. Access by any other source may generate an address decode error. All 12 trigger registers 502 in the set have an identical format that allocates one bit for each IPI destination for a total of 12 bits (e.g., the LSBs 0-11). By writing a logic '1' to any of these bits in a particular one of the trigger registers 502, the associated source may generate an interrupt at the destination represented by that bit. For example, to allow PL_1 to interrupt APU_3, the IPI controller $416_0$ can allow PL_1 to write a logic '1' to IPI destination bit 5 of the trigger resister $502_9$. If a trigger register 502 is read by the IPI source that is associated with that register, this source may read back the status of its triggers.

In order to generate an interrupt for a particular IPI destination, the specific IPI destination bit in every trigger register 502 of the set may be logically ORed by an OR gate 602 of the IPI controller $416_0$, as illustrated in FIG. 6. For example, an interrupt may be generated for APU_3 if bit 5 of the trigger register $502_9$ associated with PL_1 is a logic '1' or if bit 5 of the trigger register $502_0$ associated with RPU_0 is a logic '1'. The IPI controller $416_0$ may include a similarly configured OR gate for each potential IPI destination, for a total of 12 separate interrupt-generating OR gates in the example IPI controller $416_0$. The IPI controller $416_0$ can include similar logic configurations for other processing units.

Returning to FIG. 5, when a destination processor is interrupted, the destination processor may read from a read-only status register 504 that is allocated to that destination to determine which IPI source contributed to that interrupt. For example, after being interrupted, APU_3 may read bit 9 of its associated status register $504_5$ to determine that PL_1 was responsible for this interrupt. All twelve status registers 504 in the set have an identical format that allocates one bit for each IPI source for a total of 12 bits (e.g., the 12 LSBs). A similar write-only clear register 506 (e.g., $506_5$ for APU_3) is used to clear the request from the IPI source in the corresponding status register 504 ($504_5$ for APU_3). If a logic '1' is written to any bit in a particular one of the clear registers 506, the request for the interrupt that is associated with that source is cleared. Writing a logic '0' has no impact in this case. There is a separate status register 504 and a separate clear register 506 associated with each IPI destination in a set. The status and clear registers associated with the same destination are mapped to the same address. Accesses by any IPI destination that is not associated with a status or clear register may result in an address decode error.

According to some examples, the IC 400 may also include a payload register. The payload register may be kept in memory of the IC 400 or located in an IPI controller. If stored in memory, the payload register may have a fixed address in the memory map. The payload register may be a set of general-purpose registers. For some examples, each of the IPI controllers 416 may have a payload register associated therewith. The payload register may store data that is read if one processor interrupts another (e.g., via the IPI controller). For some examples, this data may instruct a particular processor what to do upon receiving the interrupt signal from the IPI controller.

Similar to the protection mechanism for the trigger, status, and clear registers, access to the payload register may also be restricted, via the use of source (or destination) IDs. This mechanism may allow only a specific IPI source to write to a certain payload register and permit only a specific IPI destination to read a particular payload register.

Example IPI Operations

Figure 7:
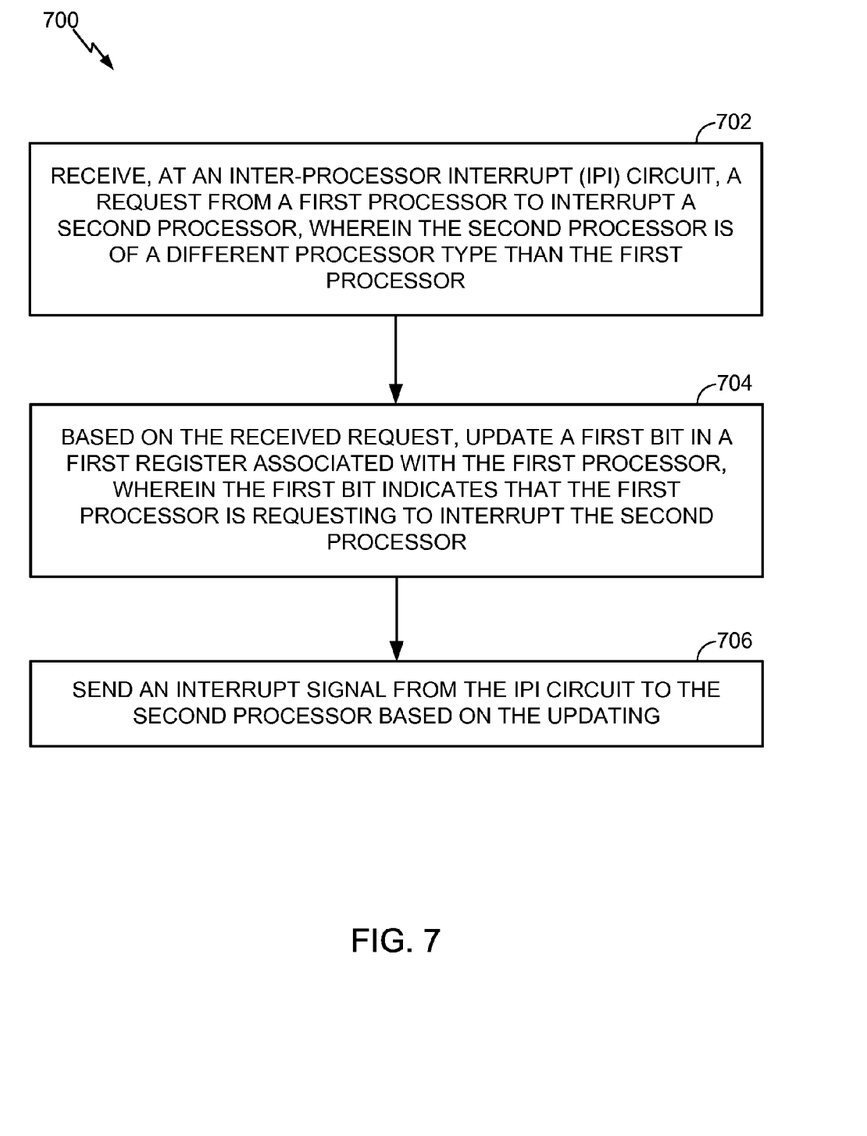
FIG. 7 is a flow diagram of example operations for handling interrupts in a heterogeneous multiprocessor system, in accordance with an example of the present disclosure.

FIG. 7 is a flow diagram of example operations 700 for handling interrupts in a heterogeneous multiprocessor system. The operations 700 may be performed by an IPI circuit, such as the IPI controller 108 or one of the IPI controllers 416.

The operations 700 may begin, at 702, with the IPI circuit receiving a request from a first processor to interrupt a second processor. The second processor is of a different processor type than the first processor.

At 704, the IPI circuit may update a first bit in a first register associated with the first processor, based on the request received at 702. The first bit indicates that the first processor is requesting to interrupt the second processor. The first register may be located in the IPI circuit and may be a trigger register, for example. Updating the first bit may involve writing a logic '1' to the first bit.

At 706, the IPI circuit may send an interrupt signal to the second processor based on the updating at 704.

According to some examples, the IPI circuit may check an identifier of the first processor and may update the first bit only if the identifier of the first processor is correct.

According to some examples, the operations 700 may further include the IPI circuit receiving a request from the second processor to determine which processor requested to interrupt the second processor. In this case, the IPI circuit may read a second bit in a second register associated with the second processor. The second bit indicates that the second processor was interrupted by the first processor. The second register may be located in the IPI circuit and may be a status register, for example. After receiving the request from the second processor, the IPI circuit may send an indication based on the second bit to the second processor. For some examples, the IPI circuit may check an identifier of the second processor and send the indication based on the second bit only if the identifier of the second processor is correct.

Mechanisms for inter-processor interrupts in a heterogeneous multiprocessor system have been described. In one example, the system generally includes a first processor, a second processor being of a different processor type than the first processor, and an inter-processor interrupt (IPI) circuit coupled to the first and second processors. The IPI circuit typically includes a first register associated with the first processor, wherein a first bit in the first register indicates whether the first processor is requesting to interrupt the second processor; and a second register associated with the second processor, wherein a second bit in the second register indicates whether the second processor is requesting to interrupt the first processor.

According to some examples, the IPI circuit further includes a third register associated with the first processor, wherein a third bit in the third register indicates whether the first processor was interrupted by the second processor; and a fourth register associated with the second processor, wherein a fourth bit in the fourth register indicates whether the second processor was interrupted by the first processor. For some examples, the IPI circuit further includes a fifth register associated with the first processor, wherein a fifth bit in the fifth register indicates whether the third bit in the third register is to be cleared; and a sixth register associated with the second processor, wherein a sixth bit in the sixth register indicates whether the fourth bit in the fourth register is to be cleared.

According to some examples, the system further includes a third processor coupled to the IPI circuit, wherein a third bit in the first register indicates whether the first processor is requesting to interrupt a third processor and wherein a fourth bit in the second register indicates whether the second processor is requesting to interrupt the third processor. The third processor may be the same processor type as the first processor. For some examples, the IPI circuit comprises a logic gate to apply a logic OR operation between the third bit in the first register and the fourth bit in the second register to generate an interrupt signal for the third processor.

According to some examples, the system further includes one or more additional processors, wherein the first register includes one or more additional bits for indicating whether the first processor is requesting to generate corresponding interrupt signals for interrupting the one or more additional processors. In this case, the second register may include one or more additional bits for indicating whether the second processor is requesting to generate corresponding interrupt signals for interrupting the one or more additional processors. For some examples, at least a portion of the one or more additional bits in the first register and at least a portion of the one or more additional bits in the second register are reserved (e.g., for interrupting one or more processors not currently in the system).

According to some examples, the system further includes an integrated circuit (IC) with the first processor, the second processor, and the IPI circuit. For some examples, the IC includes a processing system (PS) portion and a programmable logic (PL) portion. In this case, the first processor may be located in the PS portion, and the second processor may be disposed in the PL portion.

According to some examples, the first processor is a hard-wired processor, and the second processor includes programmable circuitry configurable to implement different physical circuits (e.g., a soft processor).

According to some examples, the second processor cannot directly interrupt the first processor, and the first processor cannot directly interrupt the second processor.

According to some examples, the IPI circuit is configured to check an identifier of the first processor before permitting an update to the first register and to check an identifier of the second processor before permitting an update to the second register.

According to some examples, the IPI circuit is coupled to the first processor and the second processor via an interconnect.

Another example of the present invention is an integrated circuit (IC). The IC generally includes a processing system (PS) portion having one or more hard-wired processors, a programmable logic (PL) portion having one or more soft processors with physically configurable circuitry, and one or more inter-processor interrupt (IPI) circuits. Each IPI circuit is typically configured to generate one or more interrupt signals between different processors, wherein at least one of the interrupt signals is between one of the hard-wired processors in the PS portion and one of the soft processors in the PL portion.

According to some examples, each IPI circuit comprises a first set of registers; each register in the first set is associated with each processor in the hard-wired and soft processors; each register in the first set comprises a number of bits greater than or equal to the number of the hard-wired and soft processors in the integrated circuit; and in a particular register in the first set associated with a particular processor in the hard-wired and soft processors, each bit indicates whether the particular processor is requesting to interrupt a different one of the hard-wired and soft processors.

For some examples, each IPI circuit includes a second set of registers; each register in the second set is associated with each processor in the hard-wired and soft processors; each register in the second set comprises a number of bits greater than or equal to the number of the hard-wired and soft processors in the integrated circuit; and in a particular register in the second set associated with a particular processor in the hard-wired and soft processors, each bit indicates whether the particular processor was interrupted by a different one of the hard-wired and soft processors.

According to some examples, each IPI circuit includes a third set of registers; each register in the third set is associated with each processor in the hard-wired and soft processors; each register in the third set comprises a number of bits greater than or equal to the number of the hard-wired and soft processors in the integrated circuit; and in a particular register in the third set associated with a particular processor in the hard-wired and soft processors, each bit indicates whether a corresponding bit in the second set of registers is to be cleared. The first set of registers may be read/write registers, the second set of registers may be read-only registers, and the third set of registers may be write-only registers. For some examples, the hard-wired processors include four application processing units (APUs), two real-time processing units (RPUs), a configuration and security unit (CSU), and a power management unit (PMU); the PL portion includes four soft processors for a total of 12 processors; and each register in the first, second, and third sets of registers is a 32-bit register using only 12 bits for the 12 total processors.

According to some examples, each of the IPI circuits is associated with a different interrupt class.

According to some examples, the IPI circuits are disposed in the PS portion.

According to some examples, the integrated circuit further includes a payload register configured to store data that is read if one of the IPI circuits generates one of the interrupt signals between different processors. Yet another example of the invention is a method for handling IPIs. The method generally includes receiving, at an IPI circuit, a request from a first processor to interrupt a second processor, wherein the second processor is of a different processor type than the first processor; based on the received request, updating a first bit in a first register associated with the first processor, wherein the first bit indicates that the first processor is requesting to interrupt the second processor; and sending an interrupt signal from the IPI circuit to the second processor based on the updating.

While the foregoing is directed to examples of the present disclosure, other and further examples of the disclosure may be devised without departing from the basic scope thereof, and the scope thereof is determined by the claims that follow.

What is claimed is:

1. A system comprising:
 a first processor;
 a second processor being of a different processor type than the first processor;
 one or more additional processors; and
 an inter-processor interrupt (IPI) circuit coupled to the first processor, the second processor, and the one or more additional processors, comprising:
  a first register associated with the first processor, wherein a first bit in the first register indicates whether the first processor is requesting to interrupt the second processor and wherein each bit of one or more additional bits in the first register indicates whether the first processor is requesting to interrupt a different one of the one or more additional processors; and
  a second register associated with the second processor, wherein a second bit in the second register indicates whether the second processor is requesting to interrupt the first processor.

2. The system of claim 1, wherein the IPI circuit further comprises:
 a third register associated with the first processor, wherein a third bit in the third register indicates whether the first processor was interrupted by the second processor; and
 a fourth register associated with the second processor, wherein a fourth bit in the fourth register indicates whether the second processor was interrupted by the first processor.

3. A system comprising:
 a first processor;
 a second processor being of a different processor type than the first processor; and
 an inter-processor interrupt (IPI) circuit coupled to the first processor and the second processor, comprising:
  a first register associated with the first processor, wherein a first bit in the first register indicates whether the first processor is requesting to interrupt the second processor;
  a second register associated with the second processor, wherein a second bit in the second register indicates whether the second processor is requesting to interrupt the first processor;
  a third register associated with the first processor, wherein a third bit in the third register indicates whether the first processor was interrupted by the second processor;
  a fourth register associated with the second processor, wherein a fourth bit in the fourth register indicates whether the second processor was interrupted by the first processor;
  a fifth register associated with the first processor, wherein a fifth bit in the fifth register indicates whether the third bit in the third register is to be cleared; and
  a sixth register associated with the second processor, wherein a sixth bit in the sixth register indicates whether the fourth bit in the fourth register is to be cleared.

4. The system of claim 2, wherein the IPI circuit further comprises:
 a fifth register associated with the first processor, wherein a fifth bit in the fifth register indicates whether the third bit in the third register is to be cleared; and
 a sixth register associated with the second processor, wherein a sixth bit in the sixth register indicates whether the fourth bit in the fourth register is to be cleared.

5. The system of claim 1, further comprising a third processor coupled to the IPI circuit, wherein a third bit in the first register indicates whether the first processor is requesting to interrupt the third processor and wherein a fourth bit in the second register indicates whether the second processor is requesting to interrupt the third processor.

6. The system of claim 5, wherein the IPI circuit comprises a logic gate to apply a logic OR operation between the third bit in the first register and the fourth bit in the second register to generate an interrupt signal for the third processor.

7. The system of claim 1, wherein the second register includes one or more additional bits for indicating whether the second processor is requesting to generate corresponding interrupt signals for interrupting the one or more additional processors.

8. The system of claim 7, wherein at least a portion of the one or more additional bits in the first register and at least a portion of the one or more additional bits in the second register are reserved.

9. The system of claim 1, wherein the first processor comprises a hard-wired processor and wherein the second processor comprises programmable circuitry configurable to implement different physical circuits.

10. The system of claim 1, wherein the second processor cannot directly interrupt the first processor and wherein the first processor cannot directly interrupt the second processor.

11. The system of claim 1, wherein the IPI circuit is configured to:
 check an identifier of the first processor before permitting an update to the first register; and
 check an identifier of the second processor before permitting an update to the second register.

12. The system of claim 1, wherein the IPI circuit is coupled to the first processor and the second processor via an interconnect.

13. An integrated circuit comprising:
 a processing system (PS) portion comprising one or more hard-wired processors;
 a programmable logic (PL) portion comprising one or more soft processors having physically configurable circuitry; and
 one or more inter-processor interrupt (IPI) circuits, each IPI circuit configured to generate one or more interrupt signals between different processors, wherein at least one of the interrupt signals is between one of the hard-wired processors in the PS portion and one of the soft processors in the PL portion.

14. The integrated circuit of claim 13, wherein:
each IPI circuit comprises a first set of registers;
each register in the first set is associated with each processor in the hard-wired and soft processors;
each register in the first set comprises a number of bits greater than or equal to a number of the hard-wired and soft processors in the integrated circuit; and
in a particular register in the first set associated with a particular processor in the hard-wired and soft processors, each bit indicates whether the particular processor is requesting to interrupt a different one of the hard-wired and soft processors.

15. The integrated circuit of claim 14, wherein:
each IPI circuit comprises a second set of registers;
each register in the second set is associated with each processor in the hard-wired and soft processors;
each register in the second set comprises a number of bits greater than or equal to the number of the hard-wired and soft processors in the integrated circuit; and
in a particular register in the second set associated with a particular processor in the hard-wired and soft processors, each bit indicates whether the particular processor was interrupted by a different one of the hard-wired and soft processors.

16. The integrated circuit of claim 15, wherein:
each IPI circuit comprises a third set of registers;
each register in the third set is associated with each processor in the hard-wired and soft processors;
each register in the third set comprises a number of bits greater than or equal to the number of the hard-wired and soft processors in the integrated circuit; and
in a particular register in the third set associated with a particular processor in the hard-wired and soft processors, each bit indicates whether a corresponding bit in the second set of registers is to be cleared.

17. The integrated circuit of claim 16, wherein the first set of registers are read/write registers, wherein the second set of registers are read-only registers, and wherein the third set of registers are write-only registers.

18. The integrated circuit of claim 17, wherein:
the hard-wired processors comprise four application processing units (APUs), two real-time processing units (RPUs), a configuration and security unit (CSU), and a power management unit (PMU);
the PL portion comprises four soft processors for a total of 12 processors; and
each register in the first, second, and third sets of registers is a 32-bit register using only 12 bits for the 12 total processors.

19. The integrated circuit of claim 13, wherein each of the IPI circuits is associated with a different interrupt class.

20. The integrated circuit of claim 13, further comprising a payload register configured to store data that is read if one of the IPI circuits generates one of the interrupt signals between different processors.

21. A method comprising:
receiving, at an inter-processor interrupt (IPI) circuit, a request from a first processor to interrupt a second processor, wherein the second processor is of a different processor type than the first processor;
based on the received request, updating a first bit in a first register associated with the first processor, wherein the first bit indicates that the first processor is requesting to interrupt the second processor;
sending an interrupt signal from the IPI circuit to the second processor based on updating the first bit;
receiving, at the IPI circuit, another request from the first processor to interrupt a third processor;
based on the received other request, updating a second bit in the first register, wherein the second bit indicates that the first processor is requesting to interrupt the third processor and wherein the second bit has a different bit position in the first register than the first bit; and
sending another interrupt signal from the IPI circuit to the third processor based on updating the second bit.

22. The system of claim 13, wherein the IPI circuit comprises a register and is configured to permit only a single one of the soft processors in the PL portion to access the register.

* * * * *